(12) United States Patent
Mathur

(10) Patent No.: US 11,138,182 B2
(45) Date of Patent: Oct. 5, 2021

(54) COMPENSATING DATA CORRUPTION CAUSING ACTIONS AT RUNTIME

(71) Applicant: salesforce.com, inc., San Francisco, CA (US)

(72) Inventor: Rohitashva Mathur, Walnut Creek, CA (US)

(73) Assignee: salesforce.com, inc., San Francisco, CA (US)

(*) Notice: Subject to any disclaimer, the term of this patent is extended or adjusted under 35 U.S.C. 154(b) by 210 days.

(21) Appl. No.: 16/203,125

(22) Filed: Nov. 28, 2018

(65) Prior Publication Data

US 2020/0167332 A1 May 28, 2020

(51) Int. Cl.
- *G06F 16/00* (2019.01)
- *G06F 16/23* (2019.01)
- *G06F 16/215* (2019.01)
- *G06F 11/14* (2006.01)
- *G06F 16/2455* (2019.01)

(52) U.S. Cl.
CPC ...... *G06F 16/2358* (2019.01); *G06F 11/1471* (2013.01); *G06F 11/1474* (2013.01); *G06F 16/215* (2019.01); *G06F 16/2365* (2019.01); *G06F 16/2379* (2019.01); *G06F 16/24565* (2019.01); *G06F 2201/80* (2013.01); *G06F 2201/805* (2013.01); *G06F 2201/82* (2013.01)

(58) Field of Classification Search
CPC ............. G06F 16/2358; G06F 16/2365; G06F 16/2379; G06F 16/215; G06F 11/1471; G06F 11/1474; G06F 16/24565; G06F 2201/82; G06F 2201/80; G06F 2201/805; G06F 11/0787; G06F 11/0751; G06F 11/0745
See application file for complete search history.

(56) References Cited

U.S. PATENT DOCUMENTS

| | | | | |
|---|---|---|---|---|
| 7,277,900 B1 * | 10/2007 | Ganesh | ............... | G06F 16/2477 707/682 |
| 8,924,346 B2 * | 12/2014 | Colrain | .................. | G06F 9/466 707/615 |
| 9,830,223 B1 * | 11/2017 | Holenstein | .......... | G06F 11/1474 |
| 2005/0138252 A1 * | 6/2005 | Gwilt | ...................... | G06F 13/36 710/110 |
| 2007/0214191 A1 * | 9/2007 | Chandrasekaran | ......................... | G06F 16/2358 |
| 2010/0005124 A1 * | 1/2010 | Wagner | ................... | G06F 16/27 707/E17.005 |
| 2011/0282864 A1 * | 11/2011 | Collins | ............. | G06F 16/24534 707/719 |

(Continued)

*Primary Examiner* — Alexander Khong
(74) *Attorney, Agent, or Firm* — Wong & Rees LLP; Kirk D. Wong

(57) ABSTRACT

In a multitenant database, one or more supporting data tables are used to write and store tenant data. Based on the contextual data returning an indication of validity of a detected database transaction, various actions are performed. Data changes may be captured if no valid context is found. At runtime, triggers are used to set a valid context or fix mode context, and database operations causing the data corruptions are captured in a change tracking data structure. The captured data from the database operations include a primary key and an original value for each data change. The original value and primary key for each data change is used to nullify the unintended write.

20 Claims, 10 Drawing Sheets

(56) References Cited

U.S. PATENT DOCUMENTS

| | | | |
|---|---|---|---|
| 2013/0054637 A1* | 2/2013 | Dutta | G06F 16/217 |
| | | | 707/769 |
| 2013/0297855 A1* | 11/2013 | Gupta | G06F 3/0619 |
| | | | 711/103 |
| 2014/0317093 A1* | 10/2014 | Sun | G06F 16/2255 |
| | | | 707/722 |
| 2017/0220403 A1* | 8/2017 | Maag | G06F 11/3692 |
| 2020/0272620 A1* | 8/2020 | Zhang | G06F 16/2379 |

* cited by examiner

COMPENSATING DATA CORRUPTION CAUSING ACTIONS AT RUNTIME

TECHNICAL FIELD

The present invention relates generally to cloud-based data transactions, and in particular, to techniques for compensating for data corruption causing actions in custom indexes and other data structures that support data retrieval, reading, and writing processes at runtime.

BACKGROUND

A large-scale cloud-based computer system may include multiple datacenters at various geographic locations to maintain millions of sets of application data for millions of organizations as well as provide millions of sets of application services such as those for customer relationship management (CRM), secured data access, online transaction processing, mobile apps, etc., to respective users and/or customers of these organizations.

Architecturally, the large-scale cloud-based computer system may rely on a database architecture that employs standard and/or custom objects while using custom indexes and other data structures that are used to store and retrieve customer data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Figure 2:
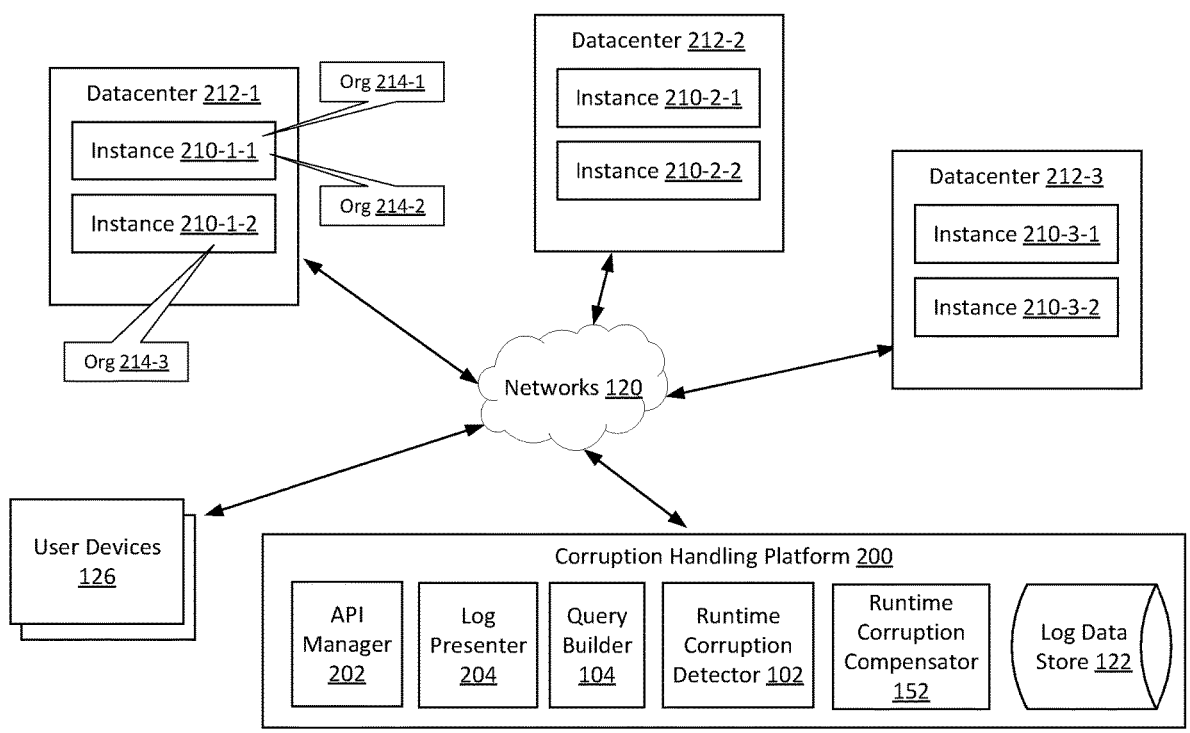
FIG. 2 illustrates an example high-level block diagram, including an example corruption handling platform.

FIG. 2 illustrates an example high-level block diagram, including an example corruption handling platform;

Example embodiments are described herein according to the following outline:

1.0. General Overview
2.0. Functional Overview
3.0. Example Embodiments
4.0 Implementation Mechanism—Hardware Overview
5.0. Extensions and Alternatives

1.0 General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Data corruptions in supporting data structures, such as custom indexes and other data structures, may prevent a tenant from accessing correct data. Custom indexes and "skinny tables" are meta structures used by processes to generate efficient database queries in response to a tenant's data fetch requests in a multitenant data platform architecture. A corrupt custom index or a corrupt skinny table means that correct data cannot be returned to a tenant (or customer/organization), resulting in a significant trust issue. A skinny table may also be referred to as a user-specified view of data stored in a multitenant data platform architecture generated at runtime.

Even through close and intensive human supervision from experts experienced in various aspects relating to manually identifying corruptions, new data corruptions continue to surface. Manual searches for data corruptions results in errors, inefficient use of resources, lack of transparency, prolonged downtimes, and organization-wide failures. Maintenance code generated to reduce corruptions, such as trigger maintenance, also fails to capture corruptions existing outside the maintenance code. Significant time and resources are spent on a continuing basis to address data corruption at runtime.

Techniques as described herein can be used by a data corruption detection and handling platform to identify data corruptions in custom indexes and/or skinny tables at runtime upon execution of a data retrieval request (e.g., while building a query, etc.), as well as any implicitly linked structures that require synchronization with another table. The synchronization is not performed by the database, but at the application level. Thus, the techniques described herein can be used for any table where the associate relationship (for e.g., a foreign key, etc.) is maintained external to the database. Data tables are data structures that hold data representing an entity. A custom index is a meta structure similar to a standard index and is used by a query builder to efficiently access a tenant's data. A skinny table is a meta structure which is a copy of data representing an entity for a given organization. Both custom indexes and skinny tables are used by the query builder in response to a tenant's data fetch requests. In this way, the term "supporting tables" may be used to refer to both custom index tables and skinny tables because both support the query builder in efficiently responding to a data retrieval request. A corrupt custom index or a corrupt skinny table indicates that correct data cannot be returned to a user (e.g., user in a multi-user environment, tenant in a multi-tenant environment, customer, organization, etc.). Detecting corruption in custom indexes and/or skinny tables is performed by the corruption handling platform at runtime.

Data retrieval requests as described herein represent a large part of normal operations in the computing system—which may host a relatively large number of organizations or tenants—based on the applications that operate on the computing system. A database transaction may entail one or more database operations or actions. A database operation may include a read, creating a new table, dropping a table, or a write, in various embodiments. Context is identified by the corruption detection platform. Here, context is a programmatic marker to mark the beginning and the end of any named code block(s). For example, a transaction context has a beginning and an ending, encompasses all the code and/or SQL statement in between, and is treated as a whole. Actions that happen in a context have context-awareness, meaning that the actions are known to have happened within the specified context, either directly or indirectly. Additionally, optionally or alternatively, context may be associated with one or more paths of execution. In an embodiment, the context is limited to the current transaction. The detector code, executed upon establishing the context, has no operative functions because establishment of the context implies a correct and complete invocation of the requested data. However, when the detector code queries and finds the context to be absent, incorrect invocation is implied and the detector code executes one of the associated actions.

It should be noted that corruption detections as described herein can operate in conjunction with other system functions relating to data retrieval, query building and/or query optimizing of the system, but there is no need for the corruption handling platform to be used to directly provide these other system functions.

A corruption handling platform as described herein operates at runtime upon receiving a request from a client device to write data to a supporting data structure. A callback hook is used to register and initialize a context. Used here, a callback hook is a piece of programmatic code, including code markers, that passes along code to be executed. A code marker may include a portion of code that enables some functionality to be associated with the code marker. The callback hook is invoked by the database prior to execution of statement(s) that would insert, update, or delete data (data manipulation language, also known as a "dml operation") in a target table. Traditionally, a transaction that involves a dml operation represents a set of operations that are executed as a single unit. All dml operations in a transaction either complete successfully, or if an error occurs in one operation, the entire transaction is rolled back and no data is committed to the database. The boundary of an operation can be a trigger, a class method, an anonymous block of code, a specially-designed page for the multitenant architecture, or a custom web service method. In short, these programmatic code markers delineate, or define, the boundaries of an execution path of instructions that perform the database operation.

Context, (e.g., execution context, contextual data, etc.), is then examined using the callback hook. If the context is found to be set, meaning that the context is properly registered and initialized, then the context is flagged to allow the current invocation and the dml operation against the table is allowed to proceed. When context is properly registered and initialized, the owning app code has determined that this particular transaction cannot cause a data corruption. Otherwise, if the context is not found while being examined or if the context cannot be registered and initialized, then one or more actions may be taken as specified, according to an embodiment. For example, a specified action may be to log the call stack trace in a table or in memory along with the current execution. Another example action to take may be to fail the current transaction. Yet another action may be to take no action at all.

A separate process, either through an application programming interface (API) or a scheduled process, polls this table and/or memory, removes duplicates, and presents the corrupting call stacks to a user of the platform.

A platform user, who may be an operator, an administrator, an authorized user, a designated user, etc., for identifying data corruptions, can send or issue a request for data corruptions affecting one or more organizations (e.g., through a web portal, a web page, etc.) to the log presenter.

An organization may comprise various components (e.g., HBase, FileForce or FFX, etc.) each of which contains application data and application services. As used herein, a component refers to a system of record that contains its respective application data (e.g., organization-specific application data, organization-common application data, customer data, FFX, HBase, etc.) and/or its respective application services (e.g., organization-specific application services, organization-common application services, customer applications, mobile apps, cloud-based applications, backend program logics, etc.). The corruption handling platform can implement a plug-and-play framework that allows different engineers respectively responsible for different components to develop, maintain, test and/or experiment respective organization specific code to be executed for different state transitions (e.g., different stages, different phases, etc.) throughout the course of data retrieval operations.

The corruption handling platform also includes methods and techniques to compensate for data corruption causing actions, at runtime. An action that results in a data change, such as statement(s) that would insert, update, or delete data (a "dml" operation) in a target table, is performed. Triggers are incorporated into the corruption handling platform such that, once a dml operation is performed, one or more triggers are activated. One trigger may determine whether a valid context exists to perform the dml operation. If no valid context exists, based on the callback hook having no established context as described above, the data changes made by the dml operation at the callback hook, or call site, can be nullified by capturing data values in a change tracking data structure. This data structure is used to capture one or more data values, including the primary key and the original data value in the supporting data structure (e.g., custom index, skinny table, etc.).

In one embodiment, other triggers may enable the changes to the affected data tables and index tables to be fixed using a fix mode context. In a further embodiment, this functionality is performed as part of the same trigger because not all databases provide for executing triggers in a specified order. A context manager may initialize, set, and declare an end to different contexts within the data transaction. Using trigger context, the affected supporting data structures are reverted back to their original values. The corruption handling platform may perform one or more verification processes to ensure the correctness of the data tables and index tables. A data verification process may include identifying rows of affected tables per transaction by capturing the primary keys of the changed rows, for example. Another data verification process may establish a beginning timestamp and an ending timestamp of the transaction and verify that the data changed within that time period has been fixed.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 Functional Overview

Figure 1A:
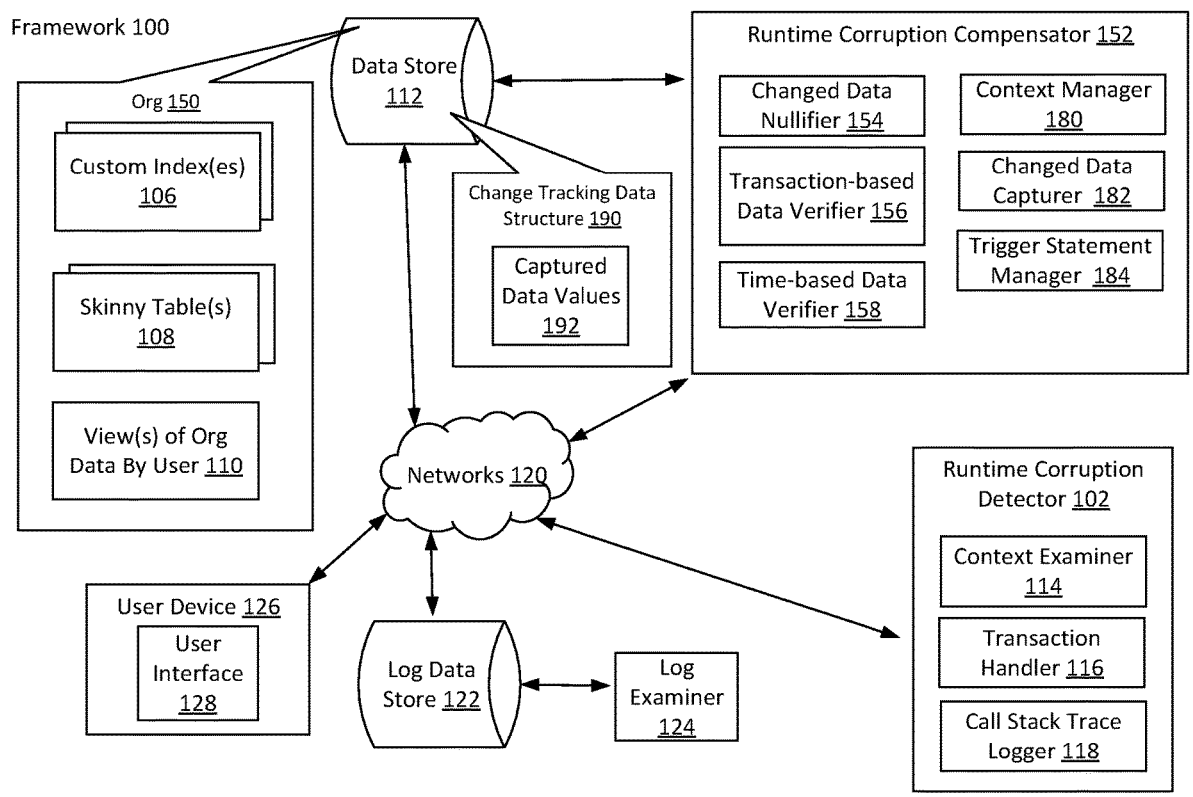
FIG. 1A illustrates an example overall data corruption compensation framework.

FIG. 1A illustrates an example overall data corruption detection and compensation framework 100 for detecting data writes that can cause corruption in data tables and compensating for those data corruptions in the same transaction in a computing system before they might become visible to others. Example computing systems that implement the data corruption detection and compensation framework (100) may include, but are not necessarily limited to: any of: a large-scale cloud-based computing system, a system with multiple datacenters, multitenant data service systems, web-based systems, systems that support massive volumes of concurrent and/or sequential transactions and interactions, database systems, and so forth. Various system constituents may be implemented through software, hardware, or a combination of software and hardware. Any, some or all of these system constituents may be interconnected and communicated directly, or through one or more networks 120.

A user device 126 may communicate with a computing system through one or more networks 120. A viewing user may interact with data in the computing system using the user device 126 through a user interface 128. For example, a salesperson may update a data value for a potential sales opportunity through the user interface 128. The salesperson may be a user within a specific organization that has thousands of records associated with opportunities. Upon requesting to modify a data value of a particular opportunity record, one or more call statements that facilitates a data write action within the opportunity record that could cause corruption are generated by the data corruption detection and compensation framework 100. The multitenant data platform architecture of the computing system uses one or more custom index tables and/or skinny tables to write data in a field mapped to an entity record of a database structure stored within the computing system at the data store 112.

As illustrated in FIG. 1A, an organization ("org") 150 may use one or more custom indexes 106, one or more skinny tables 108, and one or more views of org data by user 110 to provide faster access to data. Org data by user is presented into one or more views 110 based on permissions and security access available to the user. For example, an administrator user may have a different data view 110 than a salesperson user's data view 110. Data corruptions occur when data is being written to the custom indexes 106 or the one or more skinny tables 108. At run time, the one or more custom indexes 106 and/or one or more skinny tables 108 have been previously instantiated or invoked by one or more separate processes. If a table, such as one of the custom index tables or one of the skinny tables, becomes corrupted through a data writing action on a custom index 106 or skinny table 108, the corrupted status is detected by the runtime corruption detector 102 upon a call statement attempting to write data to the table with incorrect context, i.e., a data corruption causing context. Thus, the runtime corruption detector 102 uses a context examiner 114, a transaction handler 116, and a call stack trace logger 118 to identify corrupted tables and handle them appropriately. The runtime corruption detector 102 generates a callback hook associated with a skinny table when detecting corruptions in the skinny table. In another embodiment, the runtime corruption detector 102 uses the callback hook already associated with a custom index table when detecting corruptions in the custom index table.

A runtime corruption detector 102 uses a context examiner 114 to enable the runtime corruption detector 102 to understand the context of a code block. As mentioned above, context is understood to be a programmatic code marker that signifies a beginning and/or an ending of any code block. A context may have a name, such as a transaction context. Actions that occur within a context have knowledge of the context, either directly or indirectly. This means that an action that occurs within a context will have knowledge that the action is associated with the context.

A transaction handler 116 generates actions to be performed when a corruption is detected. Several actions may be performed once a corruption is detected; the callback hook may be flagged and logged, however the transaction may be allowed to proceed, ignoring the context, to minimize disruption to the user experience. In another embodiment, after detecting a corrupted table, an action that may be performed includes failing or terminating the transaction. In yet another embodiment, an administrative user may generate a set of rules to determine which actions are to be performed when a corruption is detected. The set of rules may include deference to high priority transactions, high level accounts, and/or other important cases where transactions should be allowed to proceed even where a data corruption is found. In further embodiments, administrative users may selectively choose to create rules where actions are to be performed based on context gathered within the transaction.

A call stack trace logger 118 generates a record of the call stack trace that led to the detected corruption in a log store 122. A log examiner 124 may later be used to analyze the log records generated by the call stack trace logger 118. The log examiner 124 may be a separate process that, through an application programming interface (API) or in a scheduled process, enables a user of the corruption detection and compensation framework 100 to access the log records.

After it is determined that a table is corrupted, the affected table, or target table, is fixed using a runtime corruption compensator 152. The runtime corruption compensator 152 uses a changed data nullifier 154, a transaction-based data verifier 156, a time-based data verifier 158, a context manager 180, a changed data capturer 182, and/or a trigger statement manager 184 to compensate for the data corruption that is detected by the runtime corruption detector 102. A data corruption is compensated by reverting the changes to the affected tables, including data tables and index tables. For example, a skinny table 108 may be affected by a dml operation that causes a data corruption at a particular call site. The runtime corruption compensator 152 uses the changed data nullifier 154 to nullify any writes to the detected data changes to any database table, including skinny table 108, and possibly including one or more custom indexes 106 in the data store 112. One organization's data corruption will only impact that organization and not others in the multitenant architecture described herein. Using the runtime corruption compensator 152, writes are nullified in that data values affected by the writes are reverted to their original values.

The runtime corruption compensator 152 may include one or more functions that write to both data and index tables. The runtime corruption detector 102 identifies the corruption causing call sites, and collects the identifiers, such as primary keys of the changed rows, in a PL/SQL data structure available via JAVA to other processes, in an embodiment. In some embodiments, the data structure is needed to further process the collected identifiers, or the primary keys of the changed rows. In other embodiments, the collected identifiers may be provided directly to a runtime corruption compensator 152. The runtime corruption compensator 152 replaces those corruption causing call sites with corresponding functions that write to both data and index tables. Data writes originate in either the java application or in PL/SQL code, in an embodiment. Thus, corresponding library functions (e.g., java_data_table_write( ) java_index_table_write( ) plsql_data_table_write( ) plsql_index_table_write( ) java_data_and_index_table_write( ) or plsql_data_and_index_table_write( )) may replace the corruption causing call site within the transaction. These library functions establish a context and extract the identifiers from the original call sites of the rows of tables that are affected. Then the library functions queries index metadata to find out information about columns for which the data is being written to the tables. Then, the corresponding values for the identifiers are written into the data tables or the custom index tables based on the type of library function. This guards against a developer mistakenly deleting or altering data that should not be changed. There are several custom index tables that support a multitenant or a multiuser database architecture, in an embodiment. Custom index tables may become out of sync when a process changes data without making sure that all custom index tables remain in sync. Similarly, skinny data tables may also become out of sync. This framework 100 thus enables a flexible extension for new features that require support structures (such as tables) that are not natively maintained by the database and require synchronous maintenance with one or more of new feature tables. For both java and PL/SQL, a function/method that writes to both data tables and custom index tables includes a logical wrapper for sequential calls of the data_table_write( ) followed by index_table_write( ) and a write coming out of data_and_index_table_write( ) is ignored by the detector 102. While the above example embodiment uses PL/SQL and JAVA for an ORACLE database framework, it is readily apparent that any database query language and interface language may be used.

A transaction-based data verifier 156 collects identifiers of rows of a transaction, and then at the end of the transaction, it is verified that the corresponding custom index tables and skinny data tables are in sync. This verification happens after the changed data nullifier 154 has nullified the corrupted data writes. If the corresponding custom index tables and skinny data tables are not in sync, then corrective action is taken, such as executing a corrective action function which may be a combination of one or more of logging (using the log examiner 124), ensuring correctness (e.g., execute the changed data nullifier 154 on the identified row of the transaction, etc.), or failing the transaction. The transaction-based data verifier 156 may or may not operate as part of the current transaction.

A time-based data verifier 158 captures the start timestamp and end timestamp for a transaction. For that time period defined by the start and end timestamps, the time-based data verifier 158 verifies that each affected table is in sync. The set of identifiers of affected rows may be received based on a system modification timestamp of the base table. By capturing the start and end of transaction timestamps, the amount of data that is examined and process is significantly reduced. Either the transaction-based data verifier 156 or the time-based data verifier 158 may operate as part of the current transaction. The identifiers of the rows are primary key or alternate key identifiers, in an embodiment.

A context manager 180 uses one or more methods or functions to manage the context of a data transaction. For example, a database object or equivalent is used to track the current context as operations are performed by triggers, such as undoing the changes performed against the target database table. Thus, the trigger context database object is managed by the context manager 180. An example method or function may declare the start of a valid context. Another example method or function may declare the start of a fix mode context, tagging the work of the being done to nullify changes. Yet another example method or function declares an end of the valid context. Another example method or function declares an end of the fix mode context. The context manager 180 may further include a method or function that returns whether the context is valid. Another method or function returns whether the context is in fix mode.

A changed data capturer 182 includes a function or method that captures the database operation (e.g., insert/update/delete, etc.) along with primary key information and the original value (if applicable). The changed data capturer 182 captures these data values 192 in a change tracking data structure 190 that is in a data store 112, in an embodiment. The change tracking data structure 190 may also be referred to a change collection table or change table. This table is written to the first time a value is changed, and information stored in the change collection table includes the original value and the type of the change (e.g., delete/insert/update, etc.) that would reverse the change. If the same value is changed again a second time during the same call, the second (and subsequent) attempts are ignored. This effectively performs a check to determine whether the primary key is present in the change table, and an entry is not made into the change table. During the restore phase (fix mode), all the primary keys from the change table are deleted from the corrupted table, and then the original entries in the change table are applied to the table according to its corresponding operation, to fix corruptions. Deletion or deleting here is logical, and its implementation may vary. For example, if the dml operation inserted a new opportunity record associated with an account object associated with an org 150, the changed data capturer 182 would capture the data values included in the insert database operation along with the primary key information. There would be no original value because the opportunity record is new. The change tracking data structure 190 is implemented as a table in the data store 112 or as PL/SQL structure.

Changes may be tracked and then subsequently applied in different ways. In one embodiment, a change is tracked using a sequential log of changes, such as the change tracking data structure 190 described above. Then, those changes are applied to the table in reverse order of occurrence. In another embodiment, the original change may be kept along with a reverse operation. Then, a logical delete and merge may be performed afterwards.

A trigger statement manager 184 is used to define trigger statements before and/or after each data table, custom index table, and/or other supporting data structures. A before statement trigger, for each data table, is triggered on execution of a dml operation and applies any pending undo changes actions in the change tracking data structure 190. The same before statement trigger then initializes and sets the trigger context using the context manager 180. An after statement trigger, for each data table, is triggered on execution of a dml operation and finalizes and ends the trigger context using the context manager 180.

An after statement trigger, for each custom index table, is triggered on execution of a dml operation and does nothing if a valid context is found or if a fix mode context is found. If a fix mode context is found, the instruction included is to do nothing because when compensating unintended changes, fixed data should not be captured which could cause a recursive loop. Otherwise, the after statement trigger initializes and sets a fix mode context using the context manager 180, reverses changes captured in the change tracking data structure 190 using the changed data nullifier 154, and then finalizes and ends the fix mode context using the context manager 180.

An after per row trigger, for each custom index table, is triggered on execution of a dml operation and does nothing if a valid context is found or if a fix mode context is found. Otherwise, the after per row trigger captures the changed data values in the dml operation using the changed data capturer 182.

Figure 1B:
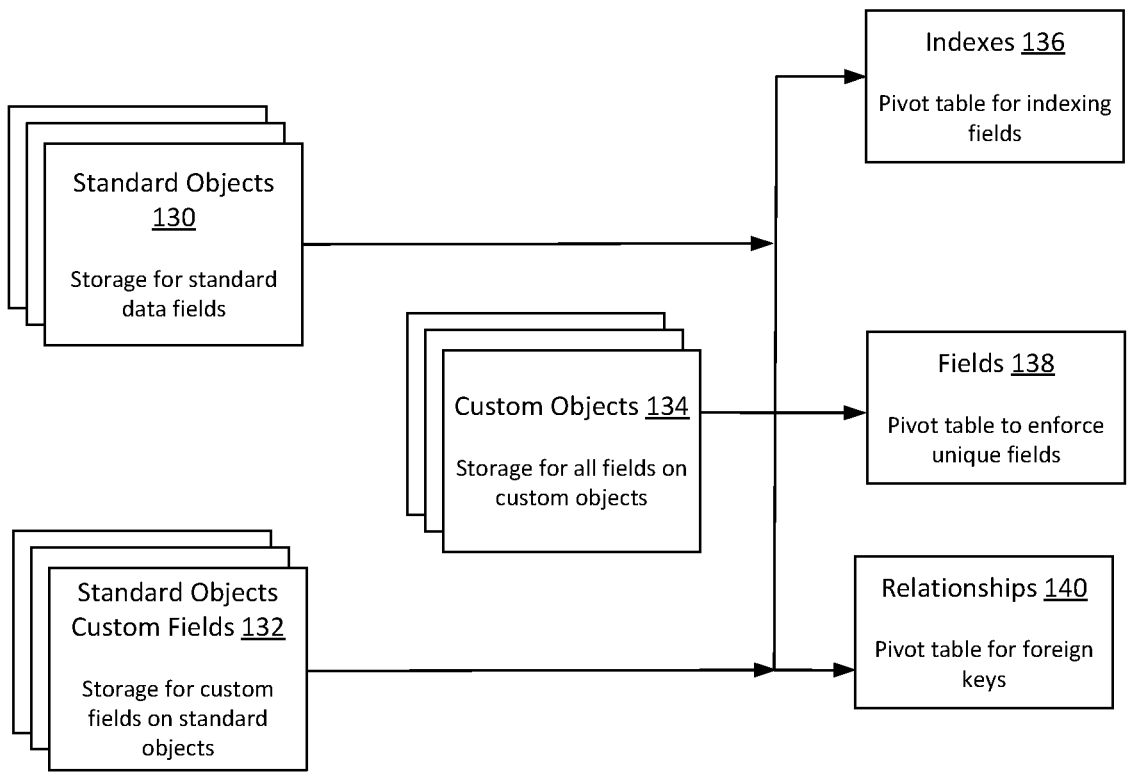
FIGS. 1B and 1C illustrate an example configuration for data objects in a multitenant data platform architecture.
Figure 1C:
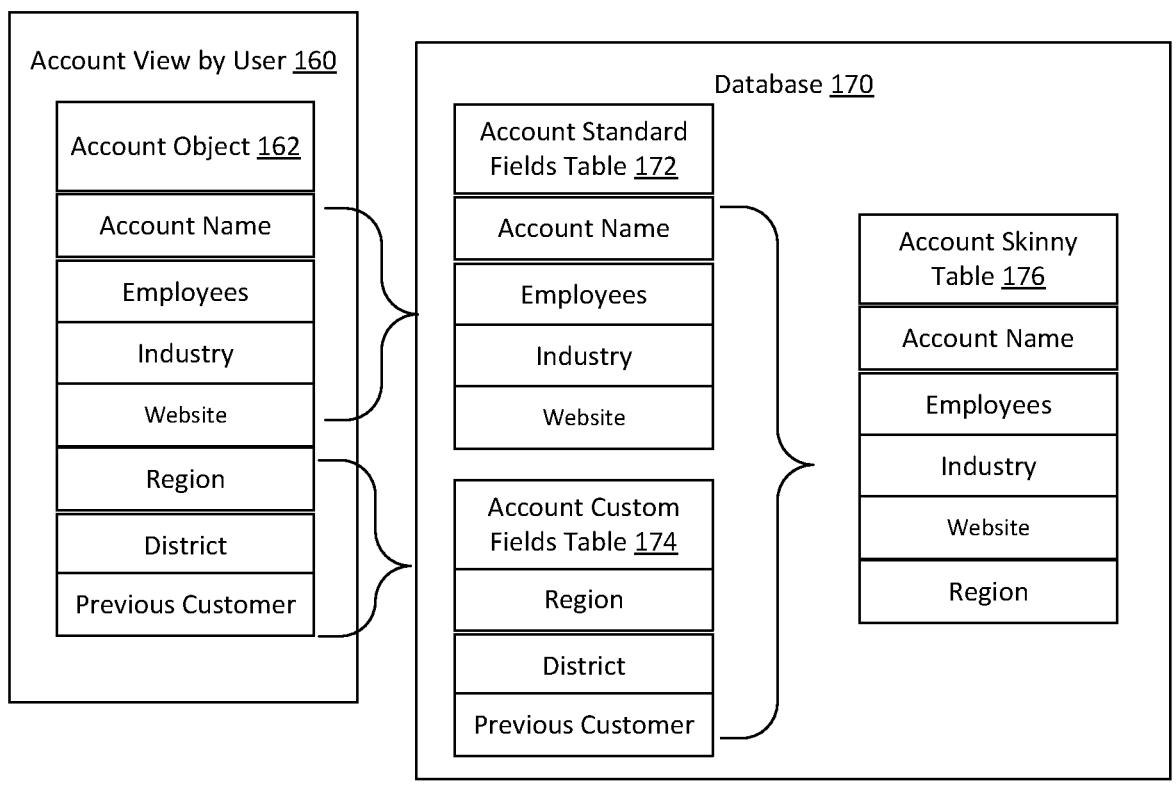

FIG. 1B and FIG. 1C illustrate an example configuration for data objects in a multitenant data platform architecture. Conventional data objects are stored persistently in a database. However, data objects in a multitenant data platform architecture include metadata such that objects may be standardized for all tenants within the multitenant data platform architecture, while also enabling tenants to add custom fields and other data objects that describe the relationships between data objects. As a result, traditional performance tuning techniques do not yield the same results on data objects in a multitenant data platform architecture. Instead of managing a vast, ever-changing set of actual database structures for each application and tenant, the multitenant data platform architecture utilizes a platform storage model that manages virtual database structures using a set of metadata, data, and pivot tables. When organizations create custom objects, the platform tracks metadata about the objects and their fields, relationships, and other object definition characteristics. The application data for all virtual tables for all organizations are stored in a few very large database tables, which are partitioned by tenant and help serve as heap storage. The platform's engine then materializes virtual table data at runtime by considering the following metadata. As shown in FIG. 1B, standard objects 130 are associated with storage for standard data fields. An example standard object 130 is an account object 162, shown in FIG. 1C. Standard fields may be stored in a standard fields table 172 in a database 170. Returning to FIG. 1B, standard objects custom fields 132 are associated with storage for custom fields on standard objects. An example of a custom field on a standard object is illustrated in FIG. 1C as a "Region" custom field on the account object.

Custom objects 134 are associated with storage for all fields on custom objects. An example of a custom object may be an object relating cities to zip codes in the US. Indexes 136 include data objects that act as pivot tables for indexing fields. Fields 138 include data objects that act as pivot tables to enforce unique fields. Relationships 140 include data objects that act as pivot tables for foreign keys. Other data objects may be used in the platform's storage model for storing and retrieving data values in the multitenant data platform architecture.

FIG. 1C illustrates an example account object, a standard object, that includes custom fields and is combined for a particular user's view 160. The user view of the account object 160 includes standard object fields of the account object: Account Name, Employees, Industry, and Website. Also included in the user's view of the Account object are custom fields: Region, District, and Previous Customer. Two tables in a database 170 store the data values of the fields included in the account object. The data values of the custom fields are stored in a separate Account Custom Fields table 174. The data values of the standard fields are stored in the Account Standard Fields table 172. These two tables are used for all data values from all orgs. An account skinny table 176 includes selected fields from the two tables per org and per object: Account Name, Employees, Industry, Website, and Region. The skinny table is a copy of the underlying data and is generated at runtime to facilitate faster access to the data. However, data corruptions arise because a missed or wrong write in one of the multiple custom indexes and/or multiple skinny tables are used to support efficient retrieval of data in the multitenant data platform architecture.

Data corruptions may take many different forms. Data may be missing from the supporting data structures (e.g., virtualized database structures mentioned above, etc.). In other embodiments, data may be in a wrong format or not normalized. For example, capitalized names of accounts may be normalized to lower case names. In any case, data corruptions lead to a disrupted user experience, causing a lack of user trust. Identifying data corruptions has also been traditionally difficult because of the platform storage model described above and issues related to multitenancy. By registering and identifying data corruptions at runtime and logging the call stack trace, or call graph, the log records detailing the data corruptions may be further examined in a separate process and/or API. In an embodiment, other processes may be used to compensate and/or correct these data corruptions. For example, a user may rollback data in a table to retrieve lost data using a runtime corruption compensator 152. As another example, complex algorithms and programmable logic may be used to correct the format of this data to compensate for non-normalized data values causing a data corruption. A further example of a way to correct or compensate for data corruptions is a debug program that detects writes or changes to a table. The context may be examined in an asynchronous manner to identify a call stack trace that led to the data corruption.

As another example, a lead object and an opportunity object may be updated in one transaction. For example, a name may be changed and data corruptions may happen if a missed or wrong write occurs. A mobile device may write a new row to the custom index table for lead objects and for opportunity objects. The functionality exposed in the user interface at the mobile device may inadvertently, based on the multitenant infrastructure described above, cause data to be written to multiple custom index tables and/or skinny data tables that causes data corruptions when the data is not in sync. Because of the multitenant architecture described above, the data corruptions may be corrected by the runtime corruption compensator 152 after the identifiers have been collected by the runtime corruption detector 102 within the same transaction.

Sub-transactions within a transaction may create autonomous transactions that writes to tables that cause tables to become out of sync, in an embodiment. An autonomous transaction will complete or fail without regards to the main transaction. If the autonomous transaction has started in the application, the runtime corruption compensator 152 collects the identifiers, generates the view, and writes it in JAVA. If the autonomous transaction has started in PL/SQL, the runtime corruption compensator 152 writes to the custom index table using the identifiers, or puts the identifiers in a transient data structure such as an array or persistent data structure such as a table. At the end of the autonomous transaction, the process path of execution will write the values within the data structure to the custom index table. A runtime corruption detector 102 may also be used to handle autonomous transactions by failing them if the context is not established.

Language specific indexing may be another example where this scheme of handling data corruptions may be beneficial. Text may be translated to a binary format where the text can be ordered in a language-specific ordering. A binary index may be generated to store the transformed text in an ordered fashion according to the specific language. By ordering the index according to a language, this enables the processing of queries to run much faster than a non-ordered language-specific index. For example, foreign languages that rely on symbols may be ordered in a specific fashion that does not translate well to latin alphabet ordering.

FIG. 2 illustrates an example high-level block diagram, including an example corruption detecting platform. In some embodiments, the computing system that hosts the organizations may comprise a plurality of datacenters such as 212-1, 212-2, 212-3, etc., as illustrated in FIG. 2, which may be located at the same or different geographic locations such as the same or different continents, the same or different countries, the same or different states, the same or different regions, and so forth.

Each data center may implement a set of system instances to host respective organizations. These organizations may contract with the owner of the computing system such as a multitenant computing system to host their respective (e.g., organization-specific, organization-common, etc.) application data, to provide their (e.g., organization-specific, organization-common, etc.) application services to their respective users and/or customers. Examples of application data may include, but are not limited to, organization-specific application data, organization-common application data, application configuration data, application data, application metadata, application code, etc., specifically generated or configured for (e.g., organization-specific, organization-common, etc.) application services of an individual organization, etc.

As used herein, the term "organization" may refer to some or all of (e.g., complete, original, a non-backup version of, a non-cached version of, an online version of, original plus one or more backup or cached copies, an online version plus one or more offline versions of, etc.) application data of an organization hosted in the computer system and application services of the organization based at least in part on the application data.

As illustrated in FIG. 2, each datacenter (e.g., 212-1, 212-2, 212-3, etc.) may comprise a set of one or more system instances. A first datacenter 212-1 comprises first system instances 210-1-1, 210-1-2, etc.; a second datacenter 212-2 comprises second system instances 210-2-1, 210-2-2, etc.; a third datacenter 212-3 comprises third system instances 210-3-1, 210-3-2, etc.

Each system instance (e.g., 210-1-1, 210-1-2, 210-2-1, 210-2-2, 210-3-1, 210-3-2, etc.) in the hosting computing system can host up to a maximum number of organizations such as 5,000 organizations, 10,000 organizations, 15,000+ organizations, etc. As illustrated in FIG. 2, the system instance (210-1-1) in the datacenter (212-1) may host a first organization 214-1 and a second organization 214-2, among others; the system instance (210-1-1) in the datacenter (212-1) may host a third organization 214-3, among others.

FIG. 2 illustrates an example corruption handling platform 200 that provides reliable, flexible and scalable protection against data corruptions affecting data retrieval in the computer system. In some embodiments, corruption detections can be performed automatically and autonomously. In some embodiments, a user can choose to specify and detect a large number (e.g., batches of hundreds, etc.) of data corruptions automatically with some manually performed actions, such as flagging the corrupted table in a log and having users inspect the logs through a separate process. In other embodiments, the log may be inspected using a program or by an application programming interface (API). An example corruption handling platform 200 includes an API manager 202, a log presenter 204, a query builder 104, a runtime corruption detector 102, and a log data store 122, in an embodiment. Thus, the corruption handling platform 200 can be used to avoid a manual, lengthy, and burdensome corruption detection process that relies on relatively heavy cross-discipline involvement and cooperation from different personnel and teams over long time periods such as months to monitor, identify, correct, reestablish functionality, etc.

A user such as an operator, an administrator, an authorized user, a designated user, and so forth, can use a user device 126 to enter or send a request for a listing of detected data corruptions to be presented through an application programming interface (API) provided by an API manager 202 or another interface provided by a log presenter 204. The user device 126 may be operatively linked to, and communicate with, the corruption handling platform 200 through one or more networks (e.g., 120, etc.) or via a local data connection.

Upon receiving the request for a listing of detected corruptions, the log presenter 204 can automatically generate a listing of call stack traces that led to each detected corruption in a custom index table or skinny table for an organization by object. For each organization, the log presenter 204 may identify where the specific organization (e.g., the first organization (214-1), etc.) is instantiated (e.g., the system instance (210-1-1) in the first datacenter (212-1), etc.), as well as other information related to the specific organization. For example, configuration data, any commands and/or operational parameters set forth for the requested organization, etc., may be gathered and provided by the log presenter 204, in an embodiment. By providing a listing of call stack traces by object, the performance of the computing system is greatly improved because problems, such as corruptions in data tables, are identified by the system automatically and may be presented to a user upon request, in an embodiment. The log presenter 204 further enables other processes and users to become aware of data corruptions faster, further increasing the reliability and functioning of the computing system because data corruptions can be addressed faster, either automatically or manually by administrative users.

At runtime, runtime corruption detector 102 identifies data corruptions in custom indexes and/or skinny tables and performs the specified actions for the identified data corruption(s). These corruption specific actions are automatically performed (e.g., flagging the data corruption and allowing the transaction to continue to execute or failing the transaction), thereby causing the framework 100 to perform with no or minimal/minor human intervention (e.g., in normal operational scenarios, etc.).

Additionally, optionally or alternatively, as a part of the continuous data corruption detection, the corruption specific actions automatically (e.g., fully automatic, automatically with a manual portion specified or performed by a user, etc.) performed under techniques as described herein can cause system configuration data, system data, system metadata, system code, etc., to be (e.g., fully automatically, with minimal manual input, etc.) generated and deployed in connection with the affected system instance (210-1-1) and/or the affected datacenter in the present example. As used herein, system configuration data, system data, system metadata, system code, etc., refers to system-level data and/or system-level services used to store, access, or manipulate the application data for the organization, to enable the application services, etc.

In contrast with a monolithic system containing all heavy lifting, potentially convoluted, program logic for performing corruption detection in tables as under other approaches, the system configuration as illustrated in FIG. 2 provides a highly efficient, scalable, extensible infrastructure for orchestrating and performing multiple different corruption detections, while leaving implementation details including, but not limited to, detected corruption steps for each table component in an affected organization to engineers and experts for each such table component. The system configuration provides an infrastructure that can be efficiently scaled up to a relatively large number (e.g., 1,000,000, 100,000, 10,000, etc.) of detected corruptions with minimized downtime and with no or minimal human intervention, as the datacenters and the system instances therein continue to scale up, and/or as organization-specific and organization-common application data and application services of respective organizations continue to spread into more and more (e.g., disparate, etc.) types of systems of records, system instances, databases, datacenters, and/or as engineering teams continue to develop respective products and features for different components (or systems of record) and make new releases of these products and features.

The infrastructure supports relatively stable and well-defined interfaces (e.g., application programming interfaces or APIs, class interfaces, table component and/or step registries etc.) comprising (e.g., abstract, default, skeleton, etc.) methods, data items, data types, and so forth, to be specifically implemented by the engineers for each table component. The infrastructure also provides or implements a table component and/or step registration mechanism for registering to-be-fixed custom index table or skinny table components and/or steps for the components. The infrastructure can support fault tolerance and relatively high resilience in data corruptions. For example, non-fatal errors in migration specific actions or steps and/or stalled operations/steps can be recovered or resolved by skipping or retrying these actions, operations or steps for a limited number of times or indefinitely and/or by implementing alternative solutions (e.g., workarounds, manual operations, temporary solutions, expedient solutions, etc.). The infrastructure can be used to collect (e.g., realtime, near-realtime, etc.) progresses of corruption specific actions or steps in response to any given data corruption and present an up-to-date consistent view and/or a call trace history of each detected corruption as stored in the log data store 122. In addition, the infrastructure can be used to support parallel (or in any order) executions of multiple different corruption specific actions or steps in a single code block or multiple different code blocks, so long as any dependency relationships between components and actions are respected or maintained.

In various embodiments, any of, some, or all combinations of a plurality of data storage facilities (e.g., the log data store 122, etc.), a plurality of data representations, etc., including, but not limited to, message-queue-based data storage facilities and/or representations, data-relational-object-based data storage facilities and/or representations, cookie-based data storage facilities and/or representations, etc., can be used to represent or store callback trace log data portions for a table component and/or any corrective step in response to a detected corruption in a table component. By way of example but not limitation, corrective steps for delayed execution can be persisted in a data storage facility or a data repository such as the log data store 122.

The corruption handling platform 200 may be implemented (e.g., as a program object, as a class object, etc.) with a context flagging process to generate log records in the log data store 122 for identified data corruptions that need manual intervention for correction. The context flagging process may determine, after a context is invoked, whether a flag is required to identify a detected corruption. Because custom index tables and skinny tables are maintained at runtime as changes are performed on a tenant's or an organization's data, context flagging is needed to catch corrupted custom index tables and skinny tables and identify the call stack traces that led to the corrupted tables. Context flagging is also referred to as contextual data herein.

The corruption handling platform 200 implements program logic responsible for logging (e.g., system logs, traces, etc.) detected corruptions of custom index tables and/or skinny tables through the runtime corruption detector 102 as well as compensated corruptions through the runtime corruption compensator 152. The log presenter 204 may be implemented as a program class/object to support or allow consumptions/manipulations of detections of corrupted custom index tables and/or skinny tables by interested program classes/objects (e.g., processes, paths of execution, objects, classes, interfaces, instantiations, implementers, methods, etc.) that are interested in such detections. For example, a user using a user device 126 may be interested in querying, through log presenter 204, the detections of corrupted tables in order to present the corrupted tables to an operator and then obtain user input from the operator with respect to any failures or issues in relation to these detections. It may be determined whether any steps to correct or compensate for data corruptions have completed successfully or failed, or whether any actions have been skipped by operators, and so forth. The log presenter 204 may operate as a separate process or as an application programming interface (API).

3.0 Example Embodiments

Figure 3:
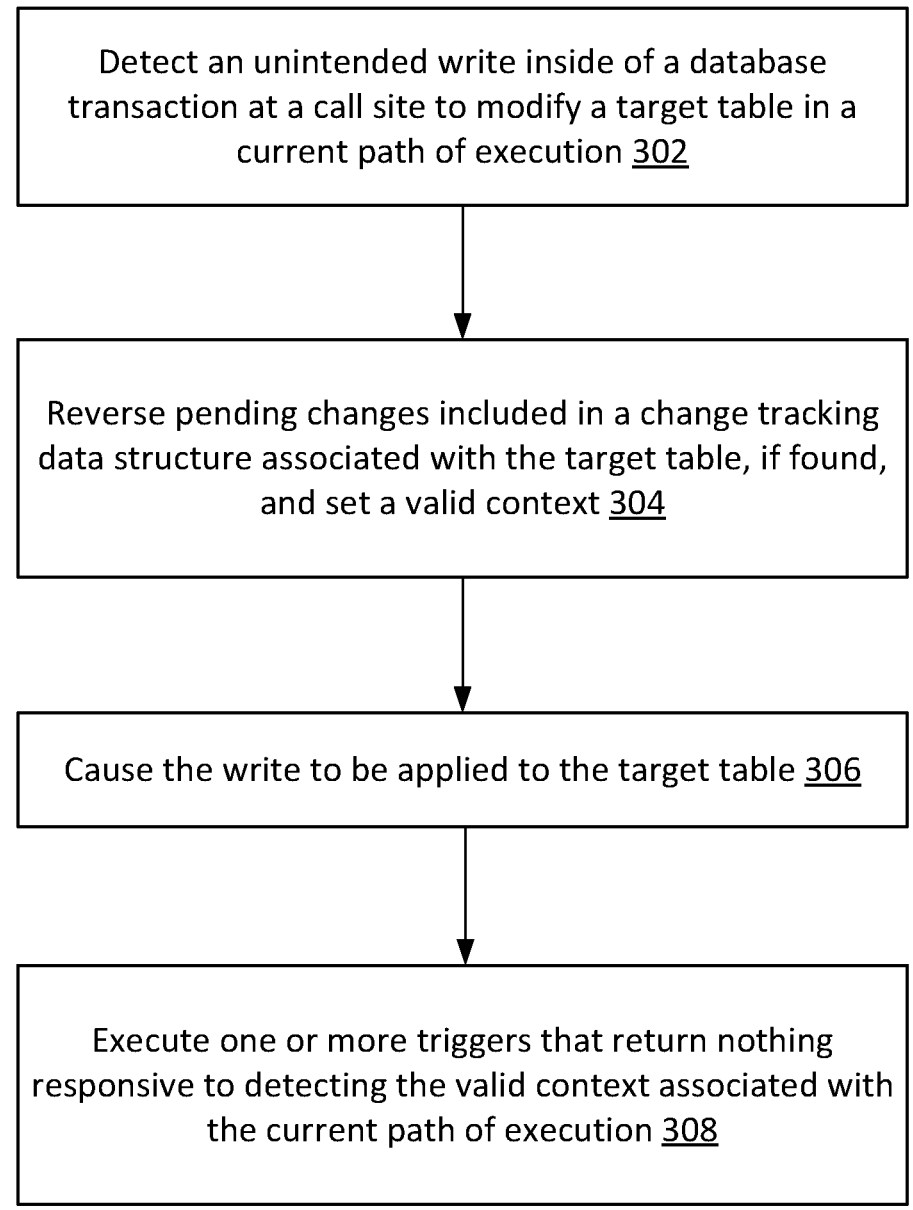
FIG. 3 illustrates an example process flow.

FIG. 3 illustrates an example process flow that may be implemented by a computing system (or device) as described herein. In block 302, a runtime corruption detector 102 (e.g., 102 of FIG. 1A, etc.) detects an unintended write inside of a database transaction at a call site to modify a target table in a current path of execution. A target table may include a supporting data structure, such as a custom index or a skinny table. Infrastructure, described above, enables supporting data structures to reflect the data stored in an underlying data table, such as an ORACLE database.

In block 304, the runtime corruption compensator 152 reverses any pending changes included in a change tracking data structure associated with the target table, if found, and set a valid context. Pending changes may have been written to the change tracking data structure by previous database execution paths, in an embodiment. In another embodiment, pending changes may have been written to the change tracking data structure by another process. In yet another embodiment, pending changes may be manually entered into the change tracking data structure.

In block 306, the write is issued against the target table. This means that the data value change included in the unintended write, such as deleting, modifying, or inserting a data value, is issued against the target table. In other words, the dml operation that is included in the database transaction is allowed to proceed on the target table. No data corruption is detected because a valid context is found.

In block 308, one or more triggers are executed by the database that return nothing responsive to detecting the valid context associated with the current path of execution.

Figure 4A:
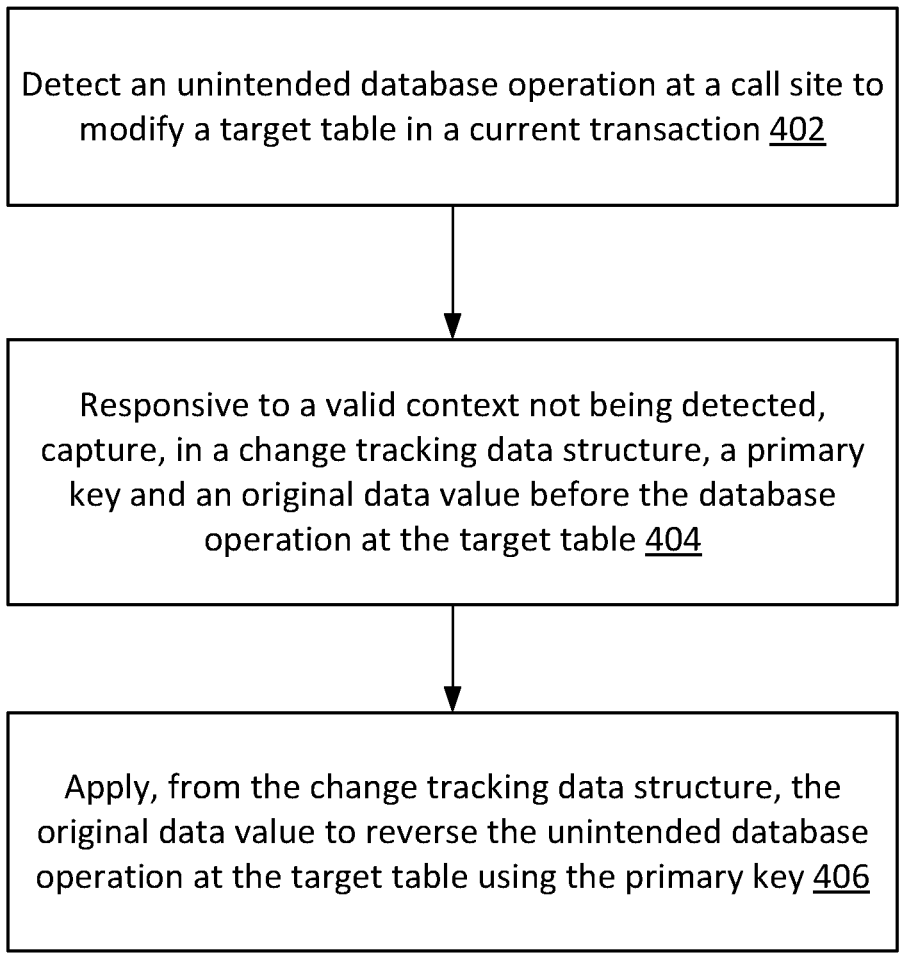
FIGS. 4A, 4B, 4C, and 4D illustrate example process flows.

FIG. 4A illustrates an example process flow that may be implemented by a computing system (or device) as described herein. In block 402, a runtime corruption detector 102 (e.g., 102 of FIG. 1A, etc.) detects an unintended database operation at a call site to modify a target table in a current transaction. The unintended database operation may be a modification of the target table, such an insertion, deletion, or modification (e.g., a write operation) of a data value in a custom index table, that has no valid context.

In block 404, responsive to not detecting a valid context, the runtime corruption compensator 152 captures, in a change tracking data structure, a primary key and an original data value before the database operation at the target table. The data modification occurs at the target table caused by the corruption causing call site. The change tracking data structure may be another custom index or database table, in an embodiment. In an embodiment, an original data value may not exist or may be null because the data change was an insert data operation.

In block 406, the original data value is applied from the change tracking data structure to the target table using the primary key by the runtime corruption compensator 152 to reverse the unintended database operation. Thus, the data corruption is corrected by writing (applying, for e.g.,) the original value of the changed rows of data at the target table. Where there is no original value, the changed row of data at the target table is deleted.

Figure 4B:
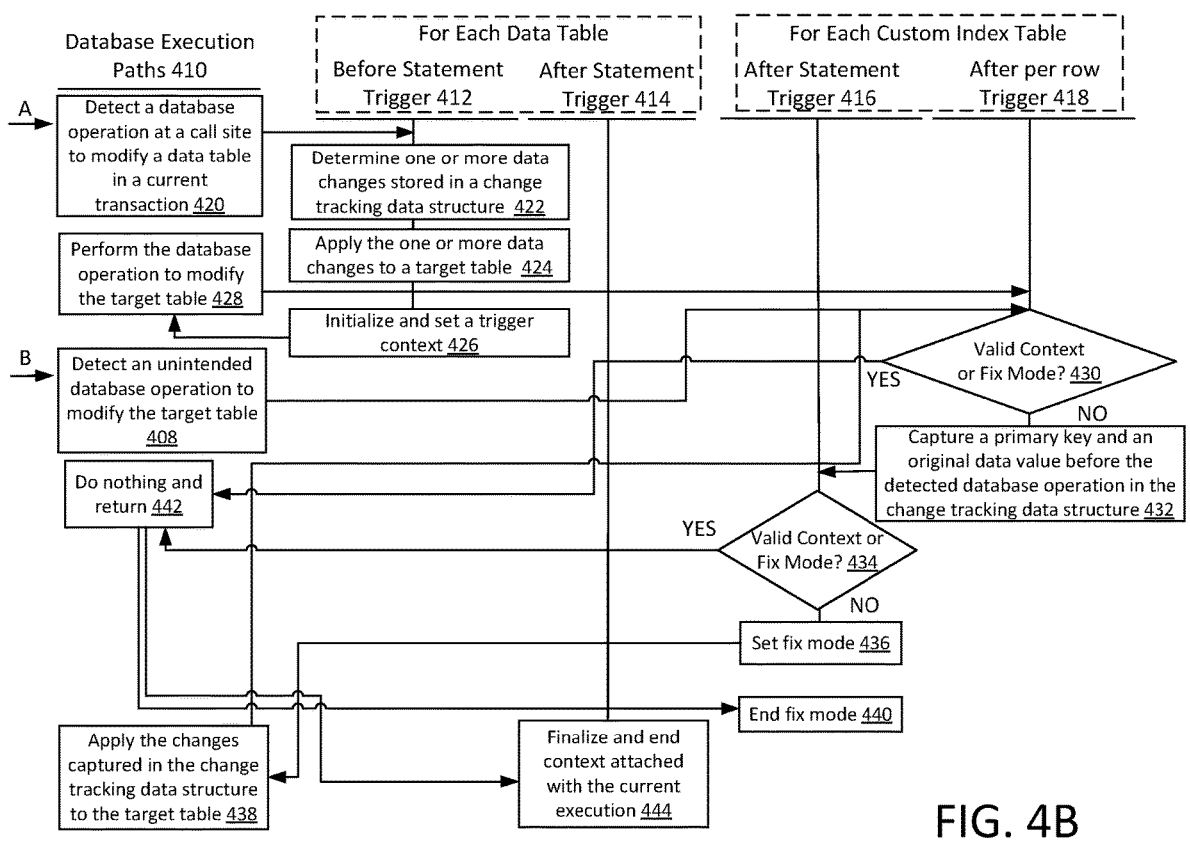

FIG. 4B illustrates another example process flow that may be implemented by a computing system (or device) as described herein. Various database triggers may be set up to operate on a data table (e.g., an ORACLE database table) and/or target tables (e.g., custom index tables and/or skinny tables). FIG. 4B illustrates how database transactions may be processed and/or compensated. As is known in the art, triggers operate in a particular way and in a particular order, specified by the type of database executing the triggers and depending on the type of trigger that is used. A row trigger is fired every time the table is affected by the triggering statement. A statement trigger is fired once on behalf of the triggering statement, regardless of the number of rows in the table that the triggering statement affects, even if no rows are affected. A before statement trigger on a data table fires the trigger action before executing the triggering statement. A before row trigger runs the trigger action, if the trigger restriction was not violated, before modifying each row affected by the triggering statement and before checking appropriate integrity constraints. An after row trigger runs the trigger action for the current row provided the trigger restriction was not violated after modifying each row affected by the triggering statement and possibly applying appropriate integrity constraints. An after statement trigger runs the trigger action after executing the triggering statement and applying any deferred integrity constraints.

Thus, the order of actions performed by triggers, for each table, is a before statement trigger, a before row trigger, an after row trigger, and an after statement trigger. Here, each data table is affected by a before statement trigger 412 and an after statement trigger 414. In addition, each custom index table is affected by an after per row trigger 418 and then an after statement trigger 416. FIG. 4B illustrates how the data interaction flow operates in a specified order for each of two scenarios. Each scenario operates in a linear manner. The two scenarios illustrated here are shown to illustrate the programmatic infrastructure supporting the functions described, according to one embodiment.

For example, a trigger statement manager 184 (e.g., 184 of FIG. 1A, etc.) is used to define the trigger statements. As shown in FIG. 4B, through an interaction flow diagram, for each data table, a before statement trigger 412 and an after statement trigger 414 may be defined. Additionally, for each custom index table, an after statement trigger 416 and an after per row trigger 418 may be defined. FIG. 4B further shows database execution paths 410 that show when database operations, such as unintended writes, are detected and performed on data tables and/or target tables, such as custom index tables. As shown in FIG. 4B, the database execution paths 410 represent execution of database path scenarios. In a first scenario, path A starts with block 420, while in a second scenario, path B starts with block 408. While two scenarios are illustrated as two paths, only one path of execution operates at a time and in a linear manner, according to an embodiment.

In block 408, an unintended database operation to modify the target table is detected by a runtime corruption detector 102 (e.g., 102 of FIG. 1A, etc.). Because the target table, or custom index table in this example, is modified in block 408, the after per row trigger 418 fires. In decision block 430, a determination is made whether a valid context exists or a fix mode is set. If either condition applies, then in block 442, nothing is done, and the process ends and/or returns. If neither condition applies, then in block 432, a primary key and an original data value before the detected database operation (if applicable) is captured in the change tracking data structure.

Next, the after statement trigger 416 fires. In decision block 434, a determination is made whether a valid context exist or a fix mode is set. If either condition applies, then in block 442, nothing is done, and the process ends and/or returns. If neither condition applies, then in block 436, fix mode is set. Because entry into this sequence was due to detecting an unintended database operation that modified the target table, a valid context cannot exist. Thus, fix mode is set.

The after statement trigger 416 causes, in block 438, the changes captured in the change tracking data structure to be applied to the target table, thus putting the original data value back into the target table, effectively reversing the changes. This triggers the after per row trigger 418 to loop back, recursively, to decision block 430. Because fix mode is set, block 442 operates such that nothing is done, and the process ends and/or returns. The after statement trigger 416 causes block 440 to perform, such that the fix mode is ended, and path B ends.

In path A, in block 420, a runtime corruption detector 102 (e.g., 102 of FIG. 1A, etc.) detects a database operation at a call site to modify a data table in a current transaction. The detection of the database transaction on the data table causes the before statement trigger 412 to fire.

In block 422, a determination whether one or more data changes are stored in a change tracking data structure is made, for example, if there are any pending undo changes in the change tracking data structure. The one or more data changes, if found, are then applied to a target table in block 424. Those changes are applied to modify the target table in block 424. For example, a fix mode may be entered to apply the one or more data changes found in the change tracking data structure. The after per row trigger 418 and the after statement trigger 416 fire after the changes are applied to the target table in block 424.

Because the target table, or custom index table in this example, is modified by applying the changes to the target table in block 424, the after per row trigger 418 fires first, and then the after statement trigger 416 fires. In decision block 430, a determination is made whether a valid context exists or fix mode is set. If either condition applies, then in block 442, nothing is done, and the process ends and/or returns. If neither condition applies, then in block 432, the database transaction along with a primary key and an original data value (if applicable) is captured in the change tracking data structure. In decision block 434, a determination is made whether a valid context exist or a fix mode is set. If either condition applies, then in block 442, nothing is done, and the process ends and/or returns. If neither condition applies, then in block 436, fix mode is set.

Thereafter, in the before statement trigger 412, in block 426, a trigger context is initialized and set for the valid context of the database transaction in block 420. The database execution path 410 on the data table causes writes based on the detected database operation to be performed on one or more supporting tables, such as the target table, in block 428. In block 428, the database operation modifies the target table as part of a database execution path 410.

Because the target table, or custom index table in this example, is modified in block 428, the after per row trigger 418 fires. In decision block 430, a determination is made whether a valid context exists or fix mode is set. If either condition applies, then in block 442, nothing is done, and the process ends and/or returns. If neither condition applies, then in block 432, a primary key and an original data value before the detected database operation (if applicable) is captured in the change tracking data structure. Here, because it is a normal database operation, a valid context exists (which was set in block 426), therefore block 442 executes as part of a database execution path 410 and nothing is done and the process ends and/or returns. This allows the database to persist the data changes at the target table before the context is finalized by the after statement trigger 414 associated with the data table, in block 444, which causes the context attached with the current execution to be ended. The notion of a transaction is used by the database to group actions as one atomic unit. Then, path A ends.

Figure 4C:
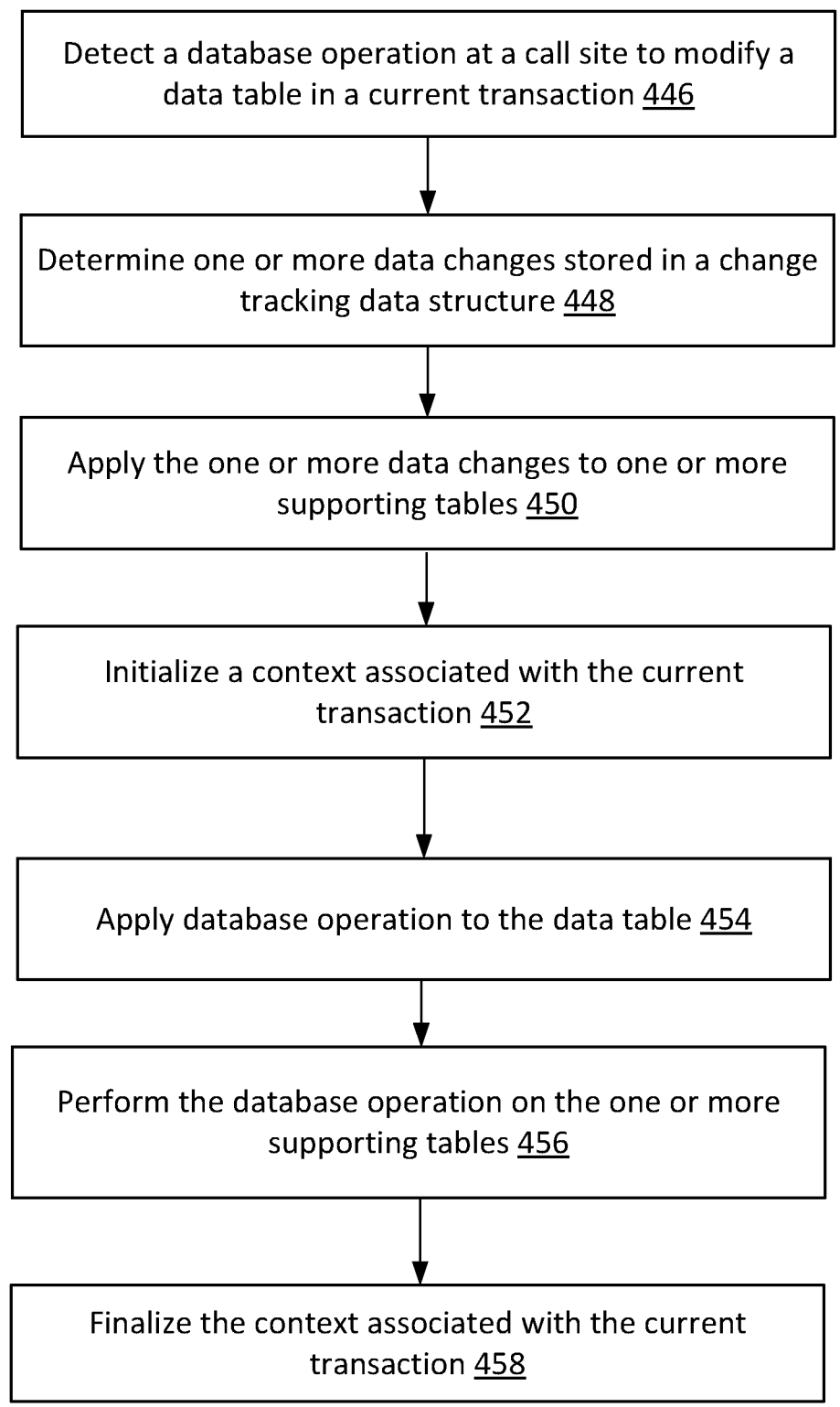
Figure 4D:
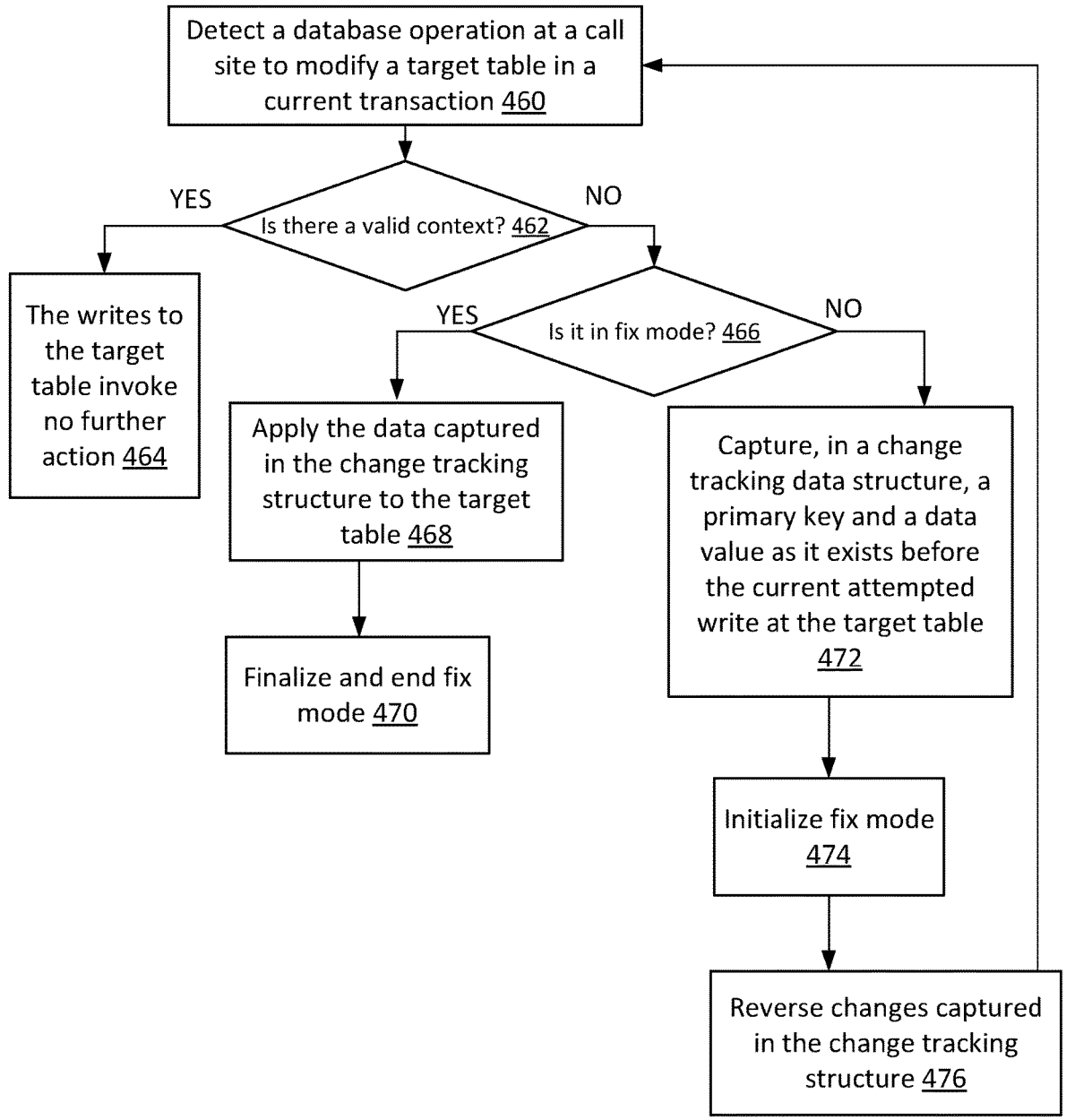

FIGS. 4C and 4D illustrate example process flows as described herein. FIG. 4C illustrates an example process flow that may be implemented by a computing system (or device) as described herein. In block 446, a runtime corruption detector 102 (e.g., 102 of FIG. 1A, etc.) detects a database operation at a call site to modify a data table. In block 448, one or more data changes stored in a change tracking data structure may be determined to exist. In block 450, the one or more data changes are applied to one or more supporting tables. If no data changes are determined to exist in block 448, no data changes are applied in block 450.

In block 452, a context associated with the current transaction is initialized. The database operationis caused to be applied to the data table in block 454. The database operation is then performed on the one or more supporting tables in block 456. This leads to block 460 in FIG. 4D, but because there is a valid context initialized, nothing happens and the writes to the target table invoke no further action as a result of decision block 462. After the database operation is performed on the one or more supporting tables in block 456, the context associated with the current transaction is finalized in block 458. This ends the context associated with the current transaction.

FIG. 4D illustrates another example process flow that may be implemented by a computing system (or device) as described herein. In block 460, a runtime corruption detector 102 (e.g., 102 of FIG. 1A, etc.) detects a database operation at a call site to modify a target table in a current transaction. In decision block 462, it is determined whether a valid context exists. If there is a valid context, then in block 464, the writes to the target table invoke no further action. If there is no valid context, then in decision block 466, it is determined whether the code that is executing as part of the transaction, or the current execution context, is in fix mode. If the current execution context is in fix mode, then the data captured in the change tracking structure is applied to the target table in block 468 and fix mode is finalized and ended in block 470.

Change tracking structures, as described herein, may have one or more variations, in an embodiment. For example, the inverse of the first ever change is kept in this table, such that subsequent changes with the same key are not registered or recorded. Applying an undo in this case is the equivalent of removing all the keys present in the change tracking structure from the target table and then applying the change and the operation that has been recorded in the change tracking structure. One variation here includes recording the actual change operation first and then applying the inverse as the undo operation. Another variation includes updating the inverse operation as the change associated with the key gets modified to reflect the original state of the target table.

In a further embodiment, a change tracking structure may capture every change or write performed on the target table sequentially in the order in which it happened. Applying an undo in this embodiment is the equivalent of applying these changes in the reverse order in which they occurred.

If the current execution context is not in fix mode, then in block 472, a primary key and a data value as it exists before the current attempted write at the target table is captured in a change tracking data structure. As described above, the capturing functionality of block 472 may be performed in one type of many variations of change tracking structures, in an embodiment. Thus, before the fix mode can be initialized, all possible changes for the target table associated with the currently executing write operation have been captured. A fix mode is then initialized in block 474, and in block 476, changes captured in the change tracking structure are reversed. After block 476, block 460 is repeated because of the detected database transaction (reversing the changes captured in the change tracking structure of block 476). Because there is no valid context, decision block 466 is reached. Here, the code that is executing as part of the transaction is in fix mode, and so the data captured in the change tracking structure is applied to the target table in block 468 and the fix mode is finalized and ended in block 470.

In various embodiments, it has been shown how a database transaction operates on a target table, as illustrated in FIGS. 4C and 4D, and as similarly illustrated in FIG. 4B. A target table is modified in block 428 with a valid context that was initialized in block 426, similar to block 456 in FIG. 4C in which the database operation is performed on the one or more supporting tables with a valid context initialized in block 452. As a result, in decision block 430, the after per row trigger 418 finds the valid context and causes the database execution path 410 to do nothing and return in block 442, similar to decision block 462 and block 464 illustrated in FIG. 4D. This allows the database operation to be applied to the target table before the context is finalized by the after statement trigger 414 associated with the data table, in block 444, which causes the context attached with the current execution to be ended.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
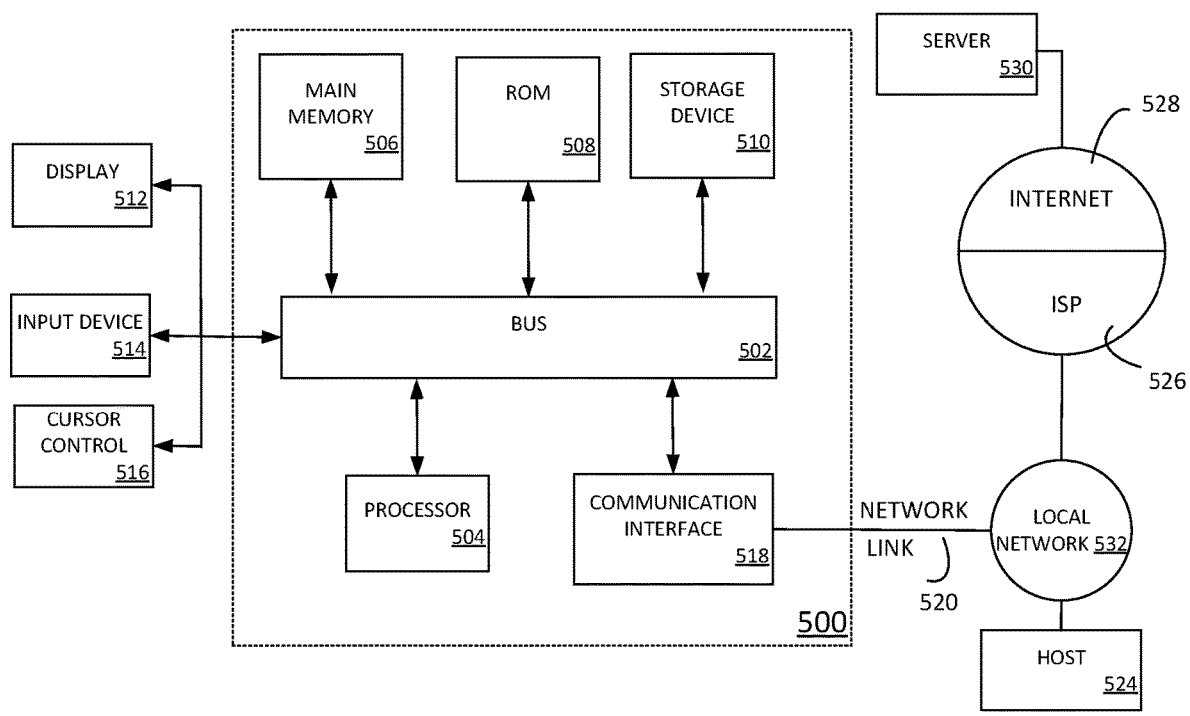
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
identifying programmatic code markers associated with defining boundaries of at least one execution path performing one or more database operations on one or more data tables associated with a multitenant database, wherein upon receiving a request to perform a database write operation on a data table, initializing a context associated with the database write operation using a programmatic code marker before performing the database write operation and finalizing the context associated with the database write operation after performing the database write operation;
determining that a request to perform an unintended database write operation on a supporting data structure associated with the one or more data tables will cause a data corruption to the supporting data structure based on an absence of a valid context; and
correcting the data corruption within completion of the unintended database write operation, wherein correcting comprises: capturing the unintended database write operation in a change tracking data structure; initializing a fix mode; reversing the change captured in the change tracking data structure; and finalizing the context associated with the data corruption and ending the fix mode.

2. The method as recited in claim 1, wherein the supporting data structure comprises a custom index table.

3. The method as recited in claim 1, wherein the supporting data structure comprises a skinny data table.

4. The method as recited in claim 1, wherein the at least one execution path is set by one or more database triggers.

5. The method as recited in claim 1, wherein the at least one execution path is set by one or more database triggers and wherein the captured unintended database write operation includes at least a primary key and an original data value.

6. The method as recited in claim 1, wherein the at least one execution path is set by one or more database triggers, wherein the captured unintended database write operation includes at least a primary key and an original data value, and wherein at least one of the one or more database triggers reverses one or more data changes in the change tracking data structure using the primary key and the original data value of each data change.

7. The method as recited in claim 1, wherein the data corruption comprises a non-matching data value in the supporting data structure compared to the one or more data tables.

8. One or more non-transitory computer readable media, storing one or more sequences of instructions, which when executed by one or more processors cause performance of:
identifying programmatic code markers associated with defining boundaries of at least one execution path performing one or more database operations on one or more data tables associated with a multitenant database, wherein comprises, upon receiving a request to perform a database write operation on a data table, initializing a context associated with the database write operation using a programmatic code marker before performing the database write operation and finalizing the context associated with the database write operation after performing the database write operation;
determining that a request to perform an unintended database write operation on a supporting data structure associated with the one or more data tables will cause a data corruption to the supporting data structure based on an absence of a valid context; and correcting the data corruption within completion of the unintended database write operation, wherein correcting comprises: capturing the unintended database write operation in a change tracking data structure; initializing a fix mode; reversing the change captured in the change tracking data structure; and finalizing the context associated with the data corruption and ending the fix mode.

9. The media as recited in claim 8, wherein the supporting data structure comprises a custom index table.

10. The media as recited in claim 8, wherein the supporting data structure comprises a skinny data table.

11. The media as recited in claim 8, wherein the at least one execution path is set by one or more database triggers.

12. The media as recited in claim 8, wherein the at least one execution path is set by one or more database triggers and wherein the captured unintended database write operation includes at least a primary key and an original data value.

13. The media as recited in claim 8, wherein the at least one execution path is set by one or more database triggers, wherein the captured unintended database write operation includes at least a primary key and an original data value, and wherein at least one of the one or more database triggers reverses one or more data changes in the change tracking data structure using the primary key and the original data value of each data change.

14. The media as recited in claim 8, wherein the data corruption comprises a non-matching data value in the supporting data structure compared to the one or more data tables.

15. A system, comprising:
one or more computing processors;
one or more non-transitory computer readable media storing a program of instructions that is executable by the one or more computing processors to perform:
identifying programmatic code markers associated with defining boundaries of at least one execution path performing one or more database operations on one or more data tables associated with a multitenant database, wherein upon receiving a request to perform a database write operation on a data table, initializing a context associated with the database write operation using a programmatic code marker before performing the database write operation and finalizing the context associated with the database write operation after performing the database write operation;

determining that a request to perform an unintended database write operation on a supporting data structure associated with the one or more data tables will cause a data corruption to the supporting data structure based on an absence of a valid context; and correcting the data corruption within completion of the unintended database write operation, wherein correcting comprises: capturing the unintended database write operation in a change tracking data structure; initializing a fix mode; reversing the change captured in the change tracking data structure; and finalizing the context associated with the data corruption and ending the fix mode.

16. The system as recited in claim 15, wherein the supporting data structure comprises a custom index table.

17. The system as recited in claim 15, wherein the at least one execution path is set by one or more database triggers.

18. The system as recited in claim 15, wherein the at least one execution path is set by one or more database triggers and wherein the captured unintended database write operation includes at least a primary key and an original data value.

19. The system as recited in claim 15, wherein the at least one execution path is set by one or more database triggers, wherein the captured unintended database write operation includes at least a primary key and an original data value, and wherein at least one of the one or more database triggers reverses one or more data changes in the change tracking data structure using the primary key and the original data value of each data change.

20. The system as recited in claim 15, wherein the data corruption comprises a non-matching data value in the supporting data structure compared to the one or more data tables.

* * * * *

UNITED STATES PATENT AND TRADEMARK OFFICE
CERTIFICATE OF CORRECTION

PATENT NO. : 11,138,182 B2
APPLICATION NO. : 16/203125
DATED : October 5, 2021
INVENTOR(S) : Rohitashva Mathur Page 1 of 1

It is certified that error appears in the above-identified patent and that said Letters Patent is hereby corrected as shown below:

In the Claims

Column 22
Claim 8: Line 58: Delete "comprises"

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*